(12) United States Patent
Mahlbacher

(10) Patent No.: US 8,260,618 B2
(45) Date of Patent: Sep. 4, 2012

(54) METHOD AND APPARATUS FOR REMOTE CONTROL OF DEVICES THROUGH A WIRELESS HEADSET USING VOICE ACTIVATION

(75) Inventor: James Christopher Mahlbacher, Lake Worth, FL (US)

(73) Assignee: Nuance Communications, Inc., Burlington, MA (US)

( * ) Notice: Subject to any disclaimer, the term of this patent is extended or adjusted under 35 U.S.C. 154(b) by 1409 days.

(21) Appl. No.: 11/614,763

(22) Filed: Dec. 21, 2006

(65) Prior Publication Data
US 2008/0154610 A1    Jun. 26, 2008

(51) Int. Cl.
*G10L 15/00* (2006.01)
(52) U.S. Cl. ............... 704/275; 704/270; 379/88.13
(58) Field of Classification Search ............ 704/270, 704/275; 379/88.13
See application file for complete search history.

(56) References Cited

U.S. PATENT DOCUMENTS

| 7,110,801 | B2 * | 9/2006 | Nassimi | 455/575.2 |
| 7,542,787 | B2 * | 6/2009 | Zhang et al. | 455/569.1 |
| 7,555,315 | B2 * | 6/2009 | Hovers et al. | 455/562.1 |
| 2003/0182132 | A1 * | 9/2003 | Niemoeller | 704/275 |
| 2008/0037727 | A1 * | 2/2008 | Sivertsen et al. | 379/88.13 |
| 2008/0059193 | A1 * | 3/2008 | Huang et al. | 704/260 |

* cited by examiner

*Primary Examiner* — Daniel D Abebe
(74) *Attorney, Agent, or Firm* — Wolf, Greenfield & Sacks, P.C.

(57) ABSTRACT

Methods and systems for remotely controlling a device through a wireless headset of a cellular phone are provided. In one implementation, the method includes storing a lookup table in a memory, in which the lookup table includes a digitized voice input and a corresponding control signal for the device. The method further includes receiving a voice input through a microphone, converting the voice input into a corresponding digital signal using an analog-to-digital converter, a voice recognition circuit recognizing the digital signal including matching the digital signal to the digitized voice input stored in the memory, and responsive to the digital signal matching the digitized voice input stored in the memory, a processor transmitting the corresponding control signal through the transceiver to the device.

16 Claims, 1 Drawing Sheet

METHOD AND APPARATUS FOR REMOTE CONTROL OF DEVICES THROUGH A WIRELESS HEADSET USING VOICE ACTIVATION

FIELD OF THE INVENTION

The present invention relates generally to communication systems, and more particularly to techniques for remotely controlling devices using voice activation.

BACKGROUND OF THE INVENTION

A remote control is an electronic device used for the remote operation of a machine or device. The term remote control (commonly referred to as a "remote") is also called a "controller", "flipper", "clicker", or "changer" is most commonly used to remotely control a television or other consumer electronics—e.g., stereo systems and DVD players. Remote controls for these devices are usually small wireless handheld objects with an array of buttons for adjusting various settings such as television channel, track number, and volume. In fact, for the majority of devices (that are controlled remotely), the remote control typically contains all the function controls while the controlled device itself only has a handful of essential primary controls. However, as the size of remote controls become smaller and smaller—e.g., as with wireless Bluetooth™ compatible headsets—the number of buttons and function controls that can be implemented onto the remote control becomes limited.

BRIEF SUMMARY OF THE INVENTION

In general, in one aspect, this specification describes a method for remotely controlling a device through a wireless headset of a cellular phone. The wireless headset includes a microphone, an analog-to-digital converter, a voice recognition circuit, a processor, a memory, and a transceiver. The method includes receiving from the device through the transceiver a lookup table including a digitized voice input and a corresponding control signal for the device; storing the lookup table in the memory; receiving a voice input through the microphone, the voice input not being received during a telephone call through the cellular phone; converting the voice input into a corresponding digital signal using the analog-to-digital converter; the voice recognition circuit recognizing the digital signal including matching the digital signal to the digitized voice input stored in the memory; and, responsive to the digital signal matching the digitized voice input stored in the memory, the processor transmitting the corresponding control signal through the transceiver to the device.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

The present invention relates generally to communication systems, and more particularly to techniques for remotely controlling devices using voice activation. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
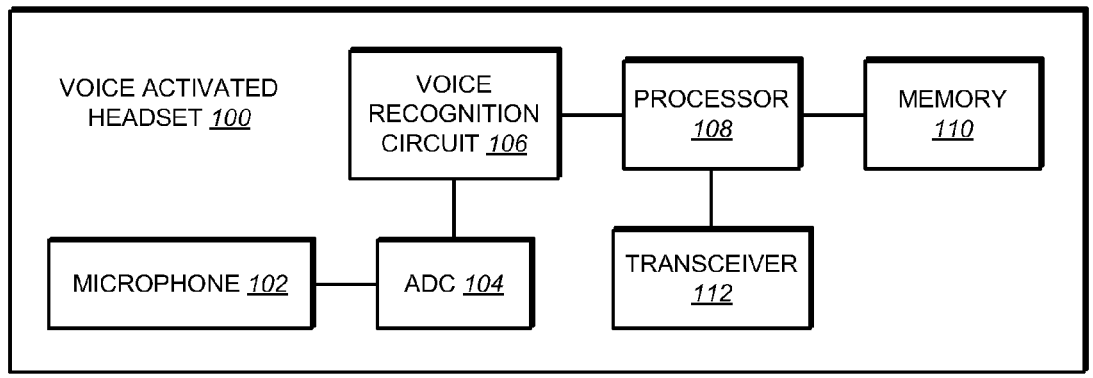
FIG. 1 is a block diagram of a voice activated headset in accordance with one implementation of the invention.

FIG. 1 illustrates a voice activated headset 100 in accordance with one implementation. In one implementation, the voice activated headset 100 is a wireless, Bluetooth compatible headset that permits wireless control of (and communication between) a handheld communication device (e.g., a cellular phone). In general, the voice activated headset 100 can be worn on the ear of a user or be clipped onto, e.g., a shirt collar of a user. The voice activated headset 100 is operable to generate control signals to remotely control one or more devices based on voice commands received, e.g., from a user. In one implementation, the voice activated headset 100 includes a microphone 102, an analog-to-digital converter 104, a voice recognition circuit 106, a processor 108, a memory 110, and a transceiver 112. The trend in wireless headsets is to reduce the weight of such headsets to provide comfort and ease of use for a user. With regard to the voice activated headset 100, the additional weight of the integrated voice recognition circuit 106 can be offset by reducing weight of a housing of the voice activated headset 100.

Figure 2:
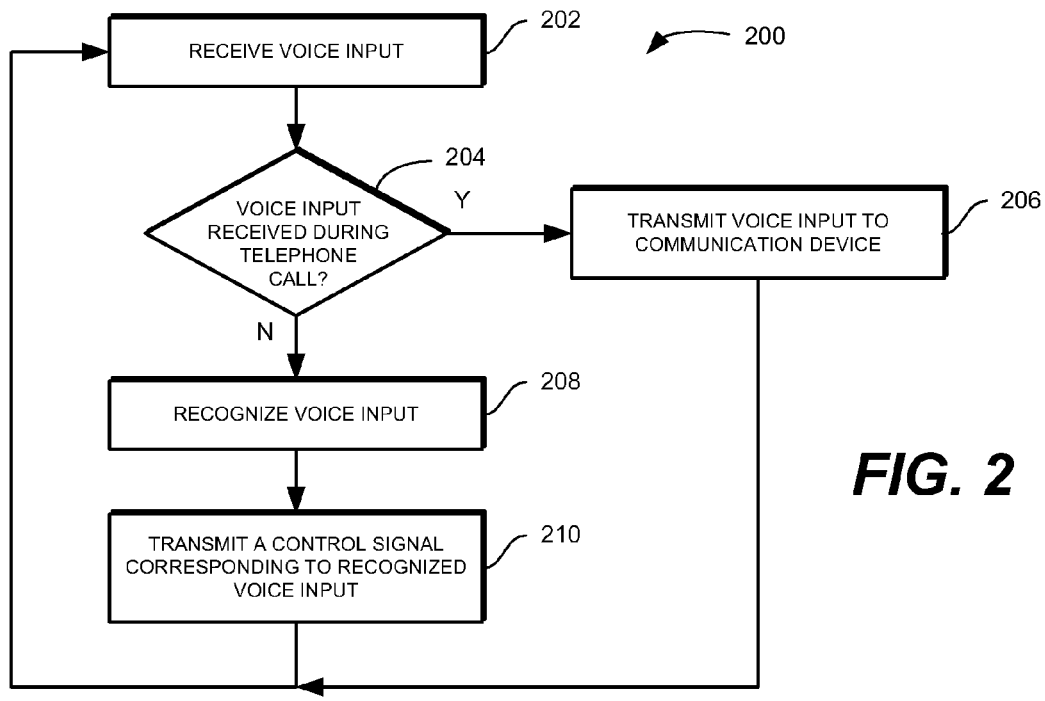
FIG. 2 illustrates a method for remotely controlling a device using the voice activated headset of FIG. 1 in accordance with one implementation of the invention.

FIG. 2 illustrates a method 200 for remotely controlling a device using the voice activated headset 100 of FIG. 1 in accordance with one implementation of the invention. A voice input is received (e.g., by microphone 102) (step 202). In one implementation, the voice input is received from a user in real-time. Alternatively, the voice input can be a computer generated voice or a pre-recorded voice. A determination is made (e.g., by a controller (not shown)) whether the voice input was received during a telephone call (step 204). If the voice input was received during a telephone call, then the voice input is transmitted to a corresponding communication device (step 206). In one implementation, the communication device is a cellular telephone, and the method 200 returns to step 202.

If, however, the voice input was not received during a telephone call, then the voice input is recognized (e.g., by voice recognition circuit 106) (step 208). In general, the voice recognition circuit 106 converts the voice input—e.g., sounds, words or phrases spoken by a user—into electrical signals (via an analog-to-digital converter), and the electrical signals are transformed into coding patterns to which a predetermined meaning has been assigned. In one implementation, the voice recognition circuit 106 implements template matching or feature analysis to recognize a voice input.

Template matching includes a user speaking a word or phrase into a microphone (e.g., microphone 102). The (analog) electrical signal from the microphone is digitized by an analog-to-digital converter (e.g., analog-to-digital converter 104) into a corresponding digital signal, and is stored in a memory (e.g., memory 110). To determine the "meaning" of this voice input, a processor (e.g., processor 108) matches the digital signal corresponding to the voice input with a digitized voice sample, (or template) that has a known (predetermined) meaning. Since each person's voice is different, (in one implementation) the memory 110 does not contain a template for each potential user, and so, therefore, the voice recognition circuit 106 must first be "trained" with a new user's voice input before the user's voice can be recognized by the voice recognition circuit 106. Thus during a training session, a device corresponding to the voice activated headset 100—e.g., a cellular phone—can display a printed word or phrase that the user can speak (several times) into the microphone 102. In one implementation, the voice recognition circuit 106 computes a statistical average of the multiple samples of the same word and stores the averaged sample as a template in a program data structure. With this approach to voice recognition, the voice recognition circuit 106 has a vocabulary that is limited to the words or phrases used in the training session, and its user base is also limited to those users who have trained the program.

Feature analysis includes processing a voice input using Fourier transforms or linear predictive coding (LPC), and attempting to find characteristic similarities between expected inputs and an actual digitized voice input. Such characteristic similarities tend to be present for a wide range of speakers and so, therefore, the voice recognition circuit 106 need not be trained by each new user. The types of speech differences that the feature analysis can deal with, but which pattern matching may fail to handle, include accents, and varying speed of delivery, pitch, volume, and inflection.

A control signal corresponding to a recognized voice input is transmitted (e.g., through transceiver 112) from the voice activated headset (step 210). In one implementation, a coded pattern (corresponding to a recognized voice input) is associated with a control signal through a lookup table stored in memory. The control signal can be transmitted to control any type of device having a receiver operable to receive the control signal. In one implementation, the voice activated headset automatically determines which devices (e.g., within communication proximity) can be controlled by the voice activated headset and establishes communication with those devices. In one implementation, each device that is operable to be controlled by the voice activated headset sends a communication packet to the voice activated headset that identifies a type (e.g., radio, television, lamp, DVD player, automobile, computer), and communication protocol (e.g., Bluetooth, Ultra Wideband (UWB), 802.11a/b/g/n, Zigbee, IR, RFID, proprietary 2.4 Ghz protocols, and the like) associated with the device. In such an implementation, a user need not configure the voice activated headset in order for the voice activated headset to control other devices.

Figure 3:
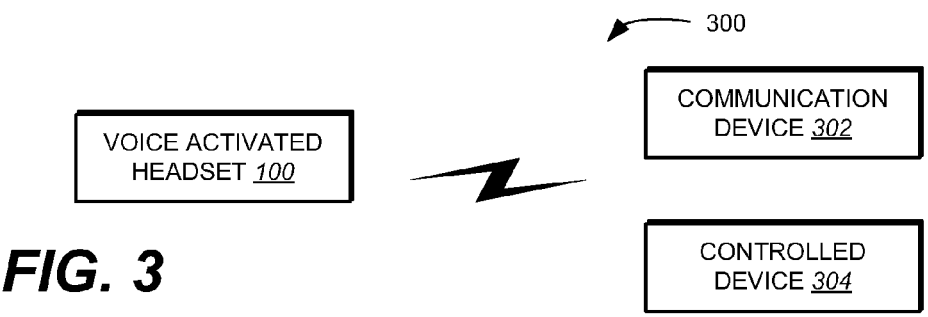
FIG. 3 is a block diagram of a communication system including the voice activated headset of FIG. 1 in accordance with one implementation of the invention.

FIG. 3 illustrates a block diagram of a communication system 300 including the voice activated headset 100 in accordance with one implementation of the invention. As shown in FIG. 3, the voice activated headset 100 is in communication with a communication device 302 (e.g., a cellular phone) and a controlled device 304. The controlled device 304 can be any type of device including, for example, a computer, an automobile, an alarm system, a television, a light, a handheld device, a radio, an appliance, a toy, and so on. As discussed above, in one implementation, one or more of the controlled devices is operable to send a communication packet to the voice activated headset 100 that identifies a type and communication protocols with the given controlled device. In one implementation, the controlled device also sends (to the voice activated headset 100) a lookup table that includes a correlation of digitized voice samples to one or more command signals associated with the controlled device. In such an implementation, the voice activated headset 100 need not be pre-configured by a user.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Various implementations for remotely controlling devices using voice activation have been described. Nevertheless, various modifications may be made to the implementations. For example, though the techniques described above apply to voice inputs, tonal sounds can also be used to remotely control a device. In addition, other technologies can be used to process and store voiceprints including, for example, frequency estimation, Hidden Markov models, pattern matching algorithms, neural networks, matrix representation, decision trees, and the like. Accordingly, many modifications may be made without departing from the scope of the following claims.

What is claimed is:
1. A method for remotely controlling a device through a wireless headset of a cellular phone, the wireless headset including a microphone, an analog-to-digital converter, a voice recognition circuit, at least one processor, at least one storage device, and a transceiver, the method including:
   receiving from the device through the transceiver at least one data structure including a mapping between a digitized voice input and a corresponding control signal for the device;
   storing the at least one data structure in the at least one storage device;
   receiving a voice input through the microphone;
   determining, in response to receiving the voice input, whether the voice input is received during a telephone call through a cellular phone in communication with the wireless headset;
   in response to determining that the voice input is received during a telephone call, transmitting the voice input to the cellular phone;
   in response to determining that the voice input is not received during a telephone call:
      digitizing the voice input as a digital voice input using the analog-to-digital converter;
      determining whether the digital voice input matches a digitized voice input stored in the at least one storage device; and responsive to determining that the digital voice input matches the digitized voice input stored in the at least one storage device, transmitting the corresponding control signal through the transceiver to the device.

2. The method of claim 1, further comprising:
receiving a second voice input during a telephone call through the cellular phone; and
transmitting the second voice input to the cellular phone without recognizing the second voice input.

3. The method of claim 1, wherein the lookup table at least one data structure is received from the device in a communication packet, the communication packet having been sent through a protocol selected from the group consisting of Bluetooth, Ultra Wideband (UWB), 802.11a/b/g/n, Zigbee, IR, RFID, or a proprietary 2.4 Ghz protocol.

4. The method of claim 1, further comprising:
receiving a communication packet from the device, wherein the communication packet identifies a type of the device and a communication protocol;
wherein the control signal is transmitted to the device in accordance with the communication protocol.

5. The method of claim 1, wherein determining whether the digital voice input matches a digitized voice input stored in the at least one storage device comprises performing template matching between the digital voice input and the digitized voice input.

6. The method of claim 1, wherein determining whether the digital voice input matches a digitized voice input stored in the at least one storage device comprises:
using feature analysis to determine whether the digital voice input is similar to a digitized voice input stored in the at least one storage device; and
determining that the digital voice input matches the digitized voice input when the digital voice input and the digitized voice input are similar.

7. A computer program product, tangibly stored on a computer-readable medium, for remotely controlling a device through a wireless headset of a cellular phone, the wireless headset including a microphone, an analog-to-digital converter, a voice recognition circuit, at least one processor, at least one storage device, and a transceiver, the computer program product comprising instructions for causing the at least one processor to:
receive from the device through the transceiver at least one data structure including a mapping between a digitized voice input and a corresponding control signal for the device;
store the at least one data structure in the at least one storage device;
determine whether a voice input is received during a telephone call through a cellular phone in communication with the wireless headset;
in response to determining that the voice input is received during a telephone call, transmitting the voice input to the cellular phone;
in response to determining that the voice input is not received during a telephone call:
digitize the voice input as a digital voice input using the analog-to-digital converter;
use the voice recognition circuit to determine whether the digital voice input matches a digitized voice input stored in the at least one storage device; and
responsive to the digital voice input matching the digitized voice input stored in the at least one storage device, transmit the corresponding control signal through the transceiver to the device.

8. The computer program product of claim 7, wherein the computer programming product further comprises instructions for causing the at least one processor to:
receive a communication packet from the device, wherein the communication packet identifies a type of the device and a communication protocol;
wherein the control signal is transmitted to the device in accordance with the communication protocol.

9. The computer program product of claim 7, wherein using the voice recognition circuit to determine whether the digital voice input matches a digitized voice input stored in the at least one storage device comprises using the voice recognition circuit to perform template matching between the digital voice input and the digitized voice input.

10. The computer program product of claim 7, wherein using the voice recognition circuit to determine whether the digital voice input matches a digitized voice input stored in the at least one storage device comprises:
using the voice recognition circuit to perform feature analysis to determine whether the digital voice input is similar to a digitized voice input stored in the at least one storage device; and
determining that the digital voice input matches the digitized voice input when the digital voice input and the digitized voice input are similar.

11. A wireless headset of a cellular phone configured to control a device, the wireless headset comprising:
a transceiver configured to receive, from the device, at least one data structure including a digitized voice input and a corresponding control signal for the device;
a storage medium configured to store the at least one data structure;
a microphone configured to receive a voice input;
at least one processor configured to:
determine, in response to receiving the voice input, whether the voice input is received during a telephone call through a cellular phone in communication with the wireless headset; and
transmit the voice input to the cellular phone in response to determining that the voice input is received during a telephone call;
an analog-to-digital converter configured to digitize the voice input into a digital voice input in response to determining that the voice input is not received during a telephone call;
a voice recognition circuit configured to determine whether the digital voice input matches a digitized voice input stored in the storage medium; and
wherein the at least one processor is further configured to transmit the corresponding control signal through the transceiver to the device in response to determining that the digital voice input matches the digitized voice input stored in the storage medium.

12. The wireless headset of claim 11, wherein the transceiver is further configured to receive a communication packet from the device, wherein the communication packet identifies a type of the device and a communication protocol; and
wherein the processor is further configured to transmit the control signal to the device in accordance with the communication protocol.

13. The wireless headset of claim 11, wherein the device is different than the cellular telephone.

14. The wireless headset of claim 11, wherein the at least one processor is further configured to:
   automatically identify at least one device in a communication proximity to the wireless headset capable of being controlled by the wireless headset; and
   establish communication with the at least one device.

15. The wireless headset of claim 11, wherein determining whether the digital voice input matches a digitized voice input stored in the storage medium comprises performing template matching between the digital voice input and the digitized voice input.

16. The wireless headset of claim 11, wherein determining whether the digital voice input matches a digitized voice input stored in the at least one storage device comprises:
   using feature analysis to determine whether the digital voice input is similar to a digitized voice input stored in the at least one storage device; and
   determining that the digital voice input matches the digitized voice input when the digital voice input and the digitized voice input are similar.

\* \* \* \* \*